April 27, 1943. R. H. D. BARKLIE ET AL 2,317,510
PROCESS FOR THE JOINING OF METALS
Filed July 23, 1940
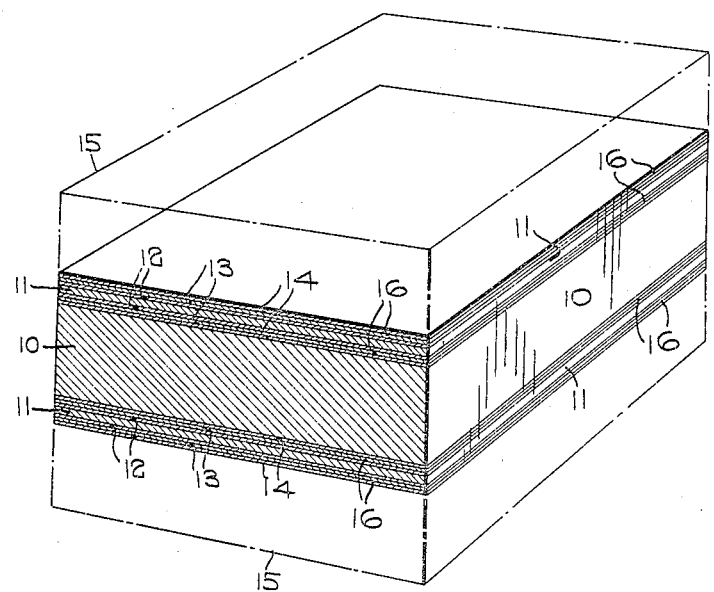
Inventors
ROBERT H. D. BARKLIE,
ALKIN LEWIS,
BY
Toulmin & Toulmin
Attorneys Patented Apr. 27, 1943

2,317,510

UNITED STATES PATENT OFFICE 2,317,510

PROCESS FOR THE JOINING OF METALS

Robert Henry Douglas Barklie, Purley, and Alkin Lewis, London, England

Application July 23, 1940, Serial No. 347,076
In Great Britain January 30, 1939

11 Claims. (Cl. 29—189)

This invention relates to a process for the joining of metals. The invention is particularly applicable to metals with which oxides form very readily on the surface when exposed to the air, such oxides normally preventing the adherence of protective coatings.

The pieces of metal to be joined together may be of the same or different composition, and the expression "metal" as used herein includes alloys.

One of the objects of the present invention is to provide a method whereby two metals, e. g. two sheets, can be joined together over the whole of their contacting surfaces.

A further object of the present invention is to provide a method whereby two metals can be joined together without affecting the physical properties of either metal.

A further object of the present invention is to provide a method whereby two metals can be joined together without it being necessary to carry out any expensive preliminary operations of deoxidizing the metals to be joined or using any great care to avoid the formation of oxide on the surfaces of the metals to be joined.

A further object of the present invention is to provide an improved joining medium or interlayer which can be readily and inexpensively applied to either or both of the surfaces to be united.

The process forming the subject of this application includes the steps of providing a metal interlayer between the metals to be joined, the interlayer consisting of two or more metals, such as zinc and cadmium, or cadmium and bismuth, which when heated, attain a pasty condition including small crystals and a liquid, heating the interlayer to bring it into such condition, and subjecting the assemblage to a mechanical working causing relative movement between the solid parts of the interlayer and the adjacent surfaces of the metals to be joined.

The interlayer is preferably such that when it is heated to a certain temperature, it will include small crystals of one of the metals which are surrounded by, and wet with liquid metal.

The interlayer may consist of a plurality of metals inserted between the two pieces of metal to be joined, or it may consist of a layer attached to, or deposited on, one of the pieces of metal under treatment. If desired a layer of metal constituting the interlayer may be attached to or deposited on both the pieces of metal to be joined.

The method according to the present invention differs from prior practice in that the interlayer is at no stage completely molten, and the joining of the two metals does not depend upon solidification of the interlayer, but rather upon the use of that interlayer in a special physical condition which exists over a comparatively small temperature range which is hereinafter specified. Further, in known soldering methods it is essential that there shall be no movement between the metals to be joined and the solder while the solder is solidifying, but in the process according to the present invention, movement is deliberately caused to occur between the crystals of the interlayer and the adjacent surfaces of the metals to be joined when the mechanical working or rolling is effected.

In the process according to this invention, an interlayer which includes at least two metals is used, which when heated, produce crystals of one of the metals, and a liquid, usually consisting of two or more metals, if more are used. It is believed that the crystals have an abrasive action upon the surfaces of the metals to be joined during the mechanical working, and that the liquid of the interlayer alloys with each of the two metals to be joined, but in an amount so small as not materially to upset the composition of the two metals to be joined. Certainly the process according to this invention is much more complicated than the simple act of uniting two metals by soldering, i. e. by solidification of a metal placed between them which wets both.

Experiments have shown that excellent results can be obtained by using an interlayer consisting of zinc and cadmium, or by using an interlayer consisting of bismuth and cadmium. Experiments have also shown that it is not possible to use successfully any two metals, and it has not yet been able to ascertain whether there are other metals that can be used in place of those suggested above. It is believed that the essentials are that at a certain temperature, small crystals shall be produced which probably must be of a certain hardness and perhaps must be of a certain shape, and these crystals must be surrounded by, and wet with a molten metal.

The present invention is particularly applicable to a method of protecting magnesium or magnesium rich alloys against corrosion, and as applied to this purpose, the method includes the steps of assembling together the body of magnesium or magnesium rich alloy and one or more covering bodies of a corrosion resisting metal, with an interlayer adapted to be reduced to a pasty condition at a temperature less than that required to soften the magnesium or magnesium rich body or the covering body or bodies, said interlayer being placed between the magnesium or magnesium rich body and the or each covering body, the interlayer consisting of two or more metals, such as zinc and cadmium, or cadmium and bismuth, which when heated, attain a pasty condition including small crystals and a liquid, heating the assemblage until the interlayer assumes such condition, and then subjecting the assemblage to a mechanical working causing relative movement between the crystals or solid parts of the interlayer and the adjacent surfaces of the metals to be joined.

The mechanical working is preferably carried out while the temperature of the assembly is falling.

The interlayer may consist of an alloy of two or more metals, or it may consist of superposed layers of two or more metals.

The interlayer may, for instance, consist of an alloy or superposed layers of zinc and cadmium, and the proportions of this alloy or of the assembled layers may be—zinc 1, cadmium 4, or zinc 4 and cadmium 1, and alloys in between these proportions. Instead of using an interlayer consisting of zinc and cadmium, an interlayer consisting of bismuth and cadmium may be used.

Instead of using an alloy or superposed layers of two metals only, the interlayer may include more than two metals provided it can be reduced to a pasty mass in which crystals or solid particles coexist with liquid metal at a temperature which is less than the temperature required for softening the metals to be joined.

If the interlayer is in the form of an alloy of zinc and cadmium, a composition, the proportions of which are near to those of the eutectic alloy, may be selected. The said proportions may be on either side of the eutectic alloy.

The interlayer may be electro-plated on to one of the metals to be joined, and in the case of covering magnesium or magnesium rich bodies for the purpose of protection against corrosion, the interlayer may be electro-plated, metal sprayed, brushed, or applied by dipping, either to the magnesium or magnesium rich body but preferably to the surface of each covering body.

The covering body or bodies may consist of metals such as aluminum or nickel or any other corrosion-resisting metal.

In carrying this invention into effect as applied to the protection of a magnesium rich alloy by covering sheets of aluminium, nickel or other metal, the covering sheets, of which there may be two, are first thoroughly degreased by known methods, and are then coated by electro-deposition on both sides with cadmium. The sheets may be placed in the plating bath for twenty seconds and a current of ten amperes per square foot of area may be used. Such a current in a cadmium bath is adapted to give a coating of a thickness of one-half of one-thousandth of an inch in one hour.

After the covering plates have been cadmium-plated in this way, they are then plated with zinc. This may be done by inserting the cadmium-coated plates in a plating bath adapted to deposit zinc for about forty seconds, the strength of the current being the same as in the case of the cadmium plating bath, and a standard solution being used.

After the zinc plating is complete, a further plating with cadmium in the cadmium bath for twenty seconds is carried out.

The magnesium rich alloy may consist of a plate, say three-quarters of an inch thick, and the covering plates of aluminium or nickel may each have a thickness of about five per cent of the magnesium plate.

The three plates, i. e. the magnesium rich plate and the two coated covering plates, are then assembled as a sandwich between heavy steel or other metal slabs, and placed in a muffle furnace until the temperature of the sandwich is about 330° C.

In the accompanying drawing the figure shows in section an application of the invention wherein the core plate 10 is of magnesium or magnesium alloy and wherein there are two covering plates 11 both of aluminium. As illustrated both covering plates of aluminium are thinly coated on both sides with an interlayer 16 formed of superposed layers of cadmium as shown at 12, zinc as shown at 13 and cadmium as shown at 15. The heavy steel or other slabs are indicated at 15.

In the illustrated construction the covering plates are shown as coated with the interlayer on both sides but this is not essential as only the side which is adjacent to the core metal 10 need be covered. Further it is, of course, not essential that there should be two covering plates. In the drawing the thickness of the cadmium and zinc layers has been exaggerated.

The temperature at which the zinc cadmium coating operates to effect adhesion, i. e. the temperature for optimum pasty condition, is a range of from 10° C. to 15° C. only at temperatures between the melting point of the pure metal and the melting point of the eutectic alloy and depending upon the exact composition of the alloy. For instance, for an interlayer consisting of zinc 1 and cadmium 4, the adhesion temperature is about 290° C. The process is carried out by heating the sandwich to a temperature well above the critical adhesion temperature and then cooling down to a temperature which ensures that the sandwich will pass through the temperature for optimum pasty condition of the interlayer, and during this cooling the mechanical working is performed.

After leaving the muffle furnace, the sandwich is passed between rolls which are heated to about 140° C. These rolls may be about two feet in diameter and their peripheral speed may be about 120 feet per minute. Pressure is exerted upon the sandwich sufficient to produce an elongation of 10% at the first pass when the plates adhere together.

After this pass the united sheets may be annealed. If the temperature is raised to 400° C. for over five minutes, a layer containing hard constituents begins to form at the junction following a mutual diffusion of the magnesium and aluminium. It is a preferred procedure to avoid the production of this layer containing hard constituents to any serious extent, and accordingly the annealing temperature is kept just below 400° C. and the time cut down to a minimum. The layer containing hard constituents cannot, however, be entirely avoided, and its thickness is reduced by subsequently rolling.

The processes of work hardening and/or if possible, precipitation hardening, may be applied to this layer however thin it may be, because the strength of the junction depends upon the strength of the layer.

It is realised that the interlayer may be raised to 400° C. i. e. over its melting point, without apparent fusion and that partial oxidation of the interlayer occurs during such heating.

The importance of oxides—bulky in relation to the metals forming them, i. e. like cadmium oxide and not like magnesium oxide—is realised. Their effect is spacially to obstruct the mutual diffusion of two dissimilar metals.

This obstruction of the mutual diffusion of the metals to be joined prevents or limits the formation of a layer containing hard constituents and permits higher temperatures than would otherwise be possible to be used for annealing the united sheets.

Subsequently the sandwich is again rolled between rollers at a higher temperature, say 260° C., and at each pass a 10% elongation is effected. The rolling continues until the assembly has been reduced to the required thickness, say about one-sixteenth or one-twentieth of an inch, the final rolling being done with cold rollers.

It has been observed that after the rolling has been completed, adhesion may be improved by heating the composite sheet to about 100° C., this heat being held for four hours.

Although a brittle constituent may exist at one stage of the process between the metals to be joined, the finished composite sheet processed as described is a ductile material.

Instead of applying the interlayer to the covering body or bodies, the interlayer may be applied by electro-deposition or by other means, to the metal to be covered.

In a modification the interlayer may be applied to the metal to be covered by any of the methods already indicated, and instead of using plates or sheets as the covering bodies, the covering bodies may be formed by metal spraying the covering metal on to the interlayer. After the covering metal has been applied to the interlayer, its outer surface may be burnished. The assemblage is then mechanically worked by rolling or one of the other methods already indicated.

The edges of the sheet or body may be protected by using a covering body of greater width than the body to be protected, and bending the edges of the covering body over the edges of the body to be protected.

Alternatively, the edges of the assembly may be protected, or the edges of pieces cut from the assembly may be protected, by metal spraying, rubber coating, or similar methods.

Any of the known devices employed in the tinplate industry may be used for the protection of the edges. Covering strips of channel or other section may be secured over all joints or edges. Rivet holes may be protected by aluminium or other eyelets seamed and sealed in position by using the method employed for securing the covering bodies.

Having described the methods of joining covering sheets on both sides of a main sheet, we wish it to be understood that the process may be extended to produce an assembly having a plurality of main sheets each protected by covering sheets to form a multi-ply sheet.

Although we have described the invention as applied to the joining of aluminium to magnesium, we wish to make it clear that the invention is equally applicable to other metals.

What we claim then is:

1. A process of joining a corrosion resisting metal to magnesium base metal including the steps of coating one of the metals to be joined with an interlayer comprising cadmium and a metal selected from the group, zinc and bismuth, in non-eutectic proportions, placing one of the metals to be joined upon the other metal to be joined with the interlayer between them, heating the assembly thus formed to a temperature of about 330° C., at which temperature a part of the metal of the inter-layer is in the form of solid crystals and deforming the elements thereof while the intermediate layer is still in a pasty state until adhesion occurs and a substantial elongation of the assembly has been effected.

2. A process of joining aluminium to magnesium base metal, including the steps of coating one of the metals to be joined with an interlayer comprising cadmium and a metal selected from the group, zinc and bismuth, in non-eutectic proportions, placing one of the metals to be joined upon the other metal to be joined with the interlayer between them, placing this assembly between heavy slabs, heating the assembly thus formed to a temperature of about 330° C., at which temperature a part of the metal of the inter-layer is in the form of solid crystals, removing the assembly from between the slabs and deforming the elements thereof while the intermediate layer is still in a pasty state until adhesion occurs and a substantial elongation of the assembly has been effected.

3. A process of joining a corrosion resisting metal to magnesium base metal including the steps of coating the corrosion resisting metal with an interlayer comprising cadmium and a metal selected from the group, zinc and bismuth in non-eutectic proportions, placing one of the metals to be joined upon the other metal to be joined with the interlayer between them placing this assembly between heavy slabs, heating the assembly thus formed to a temperature of about 330° C., at which temperature a part of the metal of the inter-layer is in the form of solid crystals, removing the assembly from between the slabs and deforming the elements thereof while the intermediate layer is still in a pasty state until adhesion occurs and a substantial elongation of the assembly has been effected.

4. A process of joining a corrosion resisting metal to magnesium base metal including the steps of, coating the corrosion resisting metal first with a thin deposit of cadmium and then with a thin deposit of a metal selected from the group, zinc and bismuth and then with a further thin deposit of cadmium, in non-eutectic proportions, placing one of the metals to be joined upon the other metal to be joined with the interlayer between them, applying pressure to the assembly, heating the assembly to a temperature exceeding 300° C., at which temperature a part of the material of the inter-layer is in the form of solid crystals, and passing the heated assembly between rollers which press the elements of the assembly together while the intermediate layer is still in a pasty state and until they have cooled to a temperature below 290° C. to effect adhesion and substantial elongation.

5. A process of joining a metal selected from the group, aluminium and nickel to magnesium base metal including the steps of coating the magnesium with an interlayer in non-eutectic proportions comprising cadmium and a metal selected from the group zinc and bismuth metal, spraying the aluminium or nickel on to the interlayer, heating the assembly to a temperature exceeding 300° C., at which temperature a part of the material of the inter-layer is in the form of solid crystals, and passing the heated assembly between rollers while the intermediate layer is still in a pasty state which press the elements of the assembly together until they have cooled to a temperature below 290° C. to effect adhesion and substantial elongation.

6. A process of joining a corrosion resisting metal to magnesium base metal including the steps of coating one of the metals to be joined with an interlayer comprising cadmium and a metal selected from the group, zinc and bismuth, in non-eutectic proportions, heating the assembly thus formed to a temperature of about 330° C., at which temperature a part of the metal of the inter-layer is in the form of solid crystals, and passing the heated assembly between rollers which press the elements thereof during cooling and while the intermediate layer is still in a pasty state until adhesion occurs and a substantial elongation of the assembly has been effected, annealing the assembly at a temperature just below 400° C., and subsequently again rolling the assembly at a temperature of approximately 260° C. and effecting an approximate elongation of 10% at each pass until the assembly has been reduced to the required thickness.

7. A process of joining a corrosion resisting metal to magnesium base metal including the steps of coating one of the metals to be joined with an interlayer comprising cadmium and a metal selected from the group, zinc and bismuth, in non-eutectic proportions, heating the assembly thus formed to a temperature of about 330° C., at which temperature a part of the metal of the inter-layer is in the form of solid crystals, and passing the heated assembly between rollers which press the elements thereof together during cooling until adhesion occurs and a substantial elongation of the assembly has been effected, annealing the assembly at a temperature just below 400° C., and subsequently again rolling the assembly while the intermediate layer is still in a pasty state at a temperature of approximately 260° C. and effecting an approximate elongation of 10% at each pass until the assembly has been reduced to the required thickness and heating the composite sheet to a temperature of approximately 100° C. maintained for about four hours.

8. A process of joining a metal selected from the group, aluminium and nickel to magnesium base metal, including the steps of coating one of the metals to be joined with an interlayer comprising cadmium and a metal selected from the group, zinc and bismuth, in non-eutectic proportions, placing one of the metals to be joined upon the other metal to be joined with the interlayer between them, applying pressure to the assembly, heating the assembly to a temperature exceeding 300° C. at which temperature a part of the metal of the inter-layer is in the form of solid crystals and passing the heated assembly between rollers while the intermediate layer is still in a pasty state which press the elements of the assembly together until they have cooled to a temperature below 290° C. to effect adhesion and substantial elongation.

9. A process of joining a corrosion resisting metal to magnesium base metal including the steps of coating one of the metals to be joined with an interlayer comprising cadmium and a metal selected from the group, zinc and bismuth in non-eutectic proportions, placing one of the metals to be joined upon the other metal to be joined with the interlayer between them, applying pressure to the assembly, heating the assembly to a temperature exceeding 300° C. at which temperature a part of the metal of the inter-layer is in the form of solid crystals and passing the assembly between heated rollers while the intermediate layer is still in a pasty state at a temperature of about 140° C. while the interlayer is at a temperature less than the melting point of the individual interlayer metal having the higher melting point and greater than the melting point of the eutectic alloy of the interlayer metals, so as to press the sheets together and to effect adhesion and a substantial elongation.

10. A process of joining nickel to a magnesium base metal, including the steps of coating one of the metals to be joined with an interlayer comprising cadmium and a metal selected from the group, zinc and bismuth, in non-eutectic proportions, placing one of the metals to be joined upon the other metal to be joined with the interlayer between them, placing this assembly between heavy slabs, heating the assembly thus formed to a temperature of about 330° C., at which temperature a part of the metal of the interlayer is in the form of solid crystals, removing the assembly from between the slabs and deforming the elements thereof while the intermediate layer is still in a pasty state until adhesion occurs and a substantial elongation of the assembly has been effected.

11. A process of joining a corrosion resisting metal to magnesium base metal including the steps of coating one of the metals to be joined with an interlayer comprising cadmium and a metal selected from the group, zinc and bismuth, in non-eutectic proportions, placing one of the metals to be joined upon the other metal to be joined with the interlayer between them, heating the assembly thus formed to a temperature of about 330° C., at which temperature a part of the metal of the interlayer is in the form of solid crystals, and deforming the elements thereof together during cooling while the layer is still in plastic state until adhesion occurs and a substantial elongation of the assembly has been effected.

ROBERT HENRY DOUGLAS BARKLIE.
ALKIN LEWIS.